(12) United States Patent
Sip et al.

(10) Patent No.: US 8,237,401 B2
(45) Date of Patent: Aug. 7, 2012

(54) RECHARGING SYSTEM AND ELECTRONIC DEVICE

(75) Inventors: Kim-Yeung Sip, Shenzhen (CN); Xiong Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 510 days.

(21) Appl. No.: 12/417,662

(22) Filed: Apr. 3, 2009

(65) Prior Publication Data

US 2010/0164431 A1    Jul. 1, 2010

(30) Foreign Application Priority Data

Dec. 29, 2008    (CN) .......................... 2008 1 0306624

(51) Int. Cl.
*H02J 7/00* (2006.01)
*H02J 7/02* (2006.01)

(52) U.S. Cl. ........ 320/108; 320/110; 320/111; 320/112; 320/114; 320/115

(58) Field of Classification Search .................... 320/108
See application file for complete search history.

(56) References Cited

U.S. PATENT DOCUMENTS

| 7,414,380 | B2* | 8/2008 | Tang et al. | 320/108 |
| 7,495,414 | B2* | 2/2009 | Hui | 320/108 |
| 2006/0043927 | A1* | 3/2006 | Beart et al. | 320/108 |
| 2006/0261778 | A1* | 11/2006 | Elizalde Rodarte | 320/114 |
| 2009/0251102 | A1* | 10/2009 | Hui | 320/108 |

FOREIGN PATENT DOCUMENTS

| CN | 1363966 A | 8/2002 |
| CN | 101330229 A | 12/2008 |

OTHER PUBLICATIONS

Junji Hirai etal, Study on intelligent battery charging using inductive transmission of power and information, IEEE Transactions on power eletrinics, Mar. 2000, vol. 25 No. 2, p. 335-345.

* cited by examiner

*Primary Examiner* — Edward Tso
*Assistant Examiner* — Ahmed Omar
(74) *Attorney, Agent, or Firm* — Altis Law Group, Inc.

(57) ABSTRACT

A recharging system for a rechargeable battery in an electronic device includes a receiver and a power supply. The receiver is fixed to a surface of a casing of the electronic device. The receiver includes a receiving coil connected to the rechargeable battery. The receiving coil is a planar spiral coil substantially parallel to the surface of the casing of the electronic device. The power supply includes a base and a source coil attached to a surface of the base corresponding to the receiving coil, and the source coil is a planar spiral coil and capable of magnetically coupling to the receiving coil of the receiver.

1 Claim, 2 Drawing Sheets

RECHARGING SYSTEM AND ELECTRONIC DEVICE

BACKGROUND

1. Technical Field

The present disclosure relates to recharging systems, and particularly, to a recharging system using electromagnetic induction phenomenon.

2. Description of Related Art

Most portable electronic devices such as cellular phones, or laptop computers, are powered by rechargeable batteries. If the voltage of the battery, of a portable electronic device such as a cellular phone, drops to a certain level, the device becomes unreliable and may shut down when this certain voltage is detected, thus the battery must be recharged to a higher voltage level using a charging/recharging device before the portable electronic device can be used again.

Connectors or a connector on a typical portable electronic device allows a recharger to connect to the portable electronic device and recharge the battery.

However, these recharging devices must be plugged into the portable electronic device to be recharged. Constant plugging and unplugging of the recharger connector with the connector of the portable electronic device degrades both the recharger connector and the portable electronic device connector. Furthermore, contaminants from one connector may be transferred the other connector, thereby reducing the useful lifetime of the connectors.

What is needed, therefore, is a recharging system for a rechargeable battery in an electronic device to overcome the above-described problems.

BRIEF DESCRIPTION OF THE DRAWINGS

Many aspects of the present recharging system can be better understood with reference to the accompanying drawings. The components in the drawings are not necessarily drawn to scale, the emphasis instead being placed upon clearly illustrating the principles of the present recharging system.

DETAILED DESCRIPTION

Embodiments of the present disclosure will now be described in detail below, with reference to the accompanying drawings.

Figure 1:
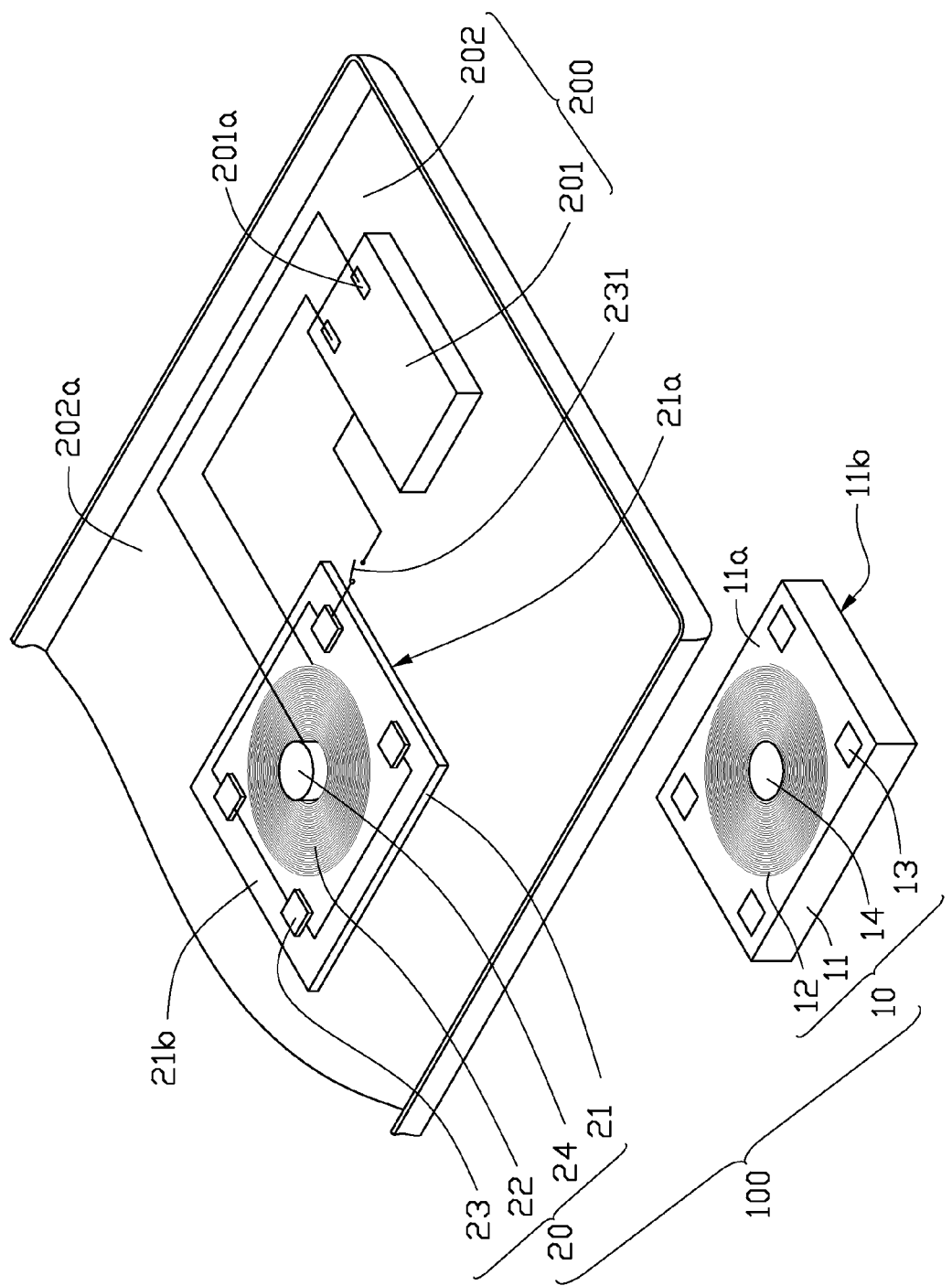
FIG. 1 is a schematic isometric view of a recharging system according to a first exemplary embodiment.

Referring to FIG. 1, a recharging system 100 according to a first exemplary embodiment includes a power supply 10 and a receiver 20. The recharging system 100 is used for recharging a rechargeable battery (not shown) in an electronic device 200.

The electronic device 200 includes a battery housing 201 and a casing 202. The battery housing 201 is configured for receiving the rechargeable battery therein. The battery housing 201 has two electrical contacts 201a for electrically connecting two electrodes (not shown) of the rechargeable battery. The casing 202 is configured for housing components of the electronic device 200, such as, circuit board, battery housing 201 and so on. The electronic device 200 can be a mobile phone, a computer, a digital camera etc. In the present embodiment, the electronic device 200 is a computer.

In the present embodiment, the receiver 20 is fixed to an inner surface 202a of the casing 202. The receiver 20 includes a first base 21, a receiving coil 22, a number of electromagnets 23, and a first core 24.

The first base 21 is made of electrical insulating material, such as plastic, wood, and so on. The first base 21 includes a first surface 21a attached to the inner surface 202a of the casing 202, and a second surface 21b opposite to the first surface 21a.

The receiving coil 22, the electromagnets 23, and the first core 24 are secured on the second surface 21b of the first base 21. The receiving coil 22 is a planar spiral coil with a number of turns and substantially parallel to the inner surface 202a of the casing 202. Therefore, the receiver 20 will have a small height and can be assembled in the electronic device 200 taking little space therein when attaching to the inner surface 202a of the casing 202. Two ends of the receiving coil 22 are connected to the two electrical contacts 201a of the battery housing 201 respectively. The receiving coil 22 can be coated with insulating material to avoid two adjacent turns of the receiving coil 22 interfering each other. The first core 24 is disposed inside the receiving coil 22 for improving electromagnetic induction efficiency of the receiver 20. The electromagnets 23 are disposed surrounding the receiving coil 22. The electromagnets 23 are magnetized when the electronic device 200 needs to be recharged. In the present embodiment, four electromagnets 23 are provided surrounding the receiving coil 22, and all of the four electromagnets 23 are connected to the rechargeable battery received in the battery housing 201 when needed. A switch 231 is disposed between the four electromagnets 23 and the rechargeable battery, and the user is able to turn on the switch 231 when recharging the battery. When the voltage of the rechargeable battery drops to a certain level or even when the electronic device 200 shuts down, the rechargeable battery is still able to magnetize the four electromagnets 23.

In other embodiment, the casing 202 of the electronic device 200 can be made of electrical insulating material, and the first base 21 can be omitted. The receiving coil 22, the electromagnets 23, and the first core 24 can be directly secured on the inner surface 202a of the casing 202.

The power supply 10 includes a second base 11, a source coil 12 connected to a power source (not shown), a number of positioning portions 13 corresponding to the electromagnets 23, and a second core 14.

The second base 11 is made of electrical insulating material, such as plastic, wood, and so on. The second base 11 includes a third surface 11a and a fourth surface 11b opposite to the third surface 11a.

The source coil 12, the positioning portions 13, and the second core 14 are secured on the third surface 11a of the second base 11. The source coil 12 is a planar spiral coil with a number of turns, and is capable of magnetically coupling to the receiving coil 22 of the receiver 20. The source coil 12 can be coated with insulating material to avoid two adjacent turns of the source coil 12 interfering each other. The second core 14 is disposed inside the source coil 12 for improving the intensity of the magnetic field generated by the source coil 12.

The positioning portions 13 are disposed surrounding the source coil 12. In the present embodiment, four positioning portions 13 are provided surrounding the source coil 12. The positioning portions 13 can be attract by the electromagnets 23. The positioning portions 13 can be electromagnets, permanent magnets, or can be made of electromagnetic material, such as iron, cobalt, nickel or combinations thereof. In the present embodiment, the positioning portions 13 are made of iron. Because the receiver 20 is received in the casing 202 of the electronic device 200 and the exact position of the receiver 20 is not marked or shown on the outer side of the casing 202, by using the electromagnets 23 and the positioning portions 13, the receiving coil 22 of the receiver 20 and the source coil 12 of the power supply 10 can be aligned with each other easily.

Using the recharging system 100, the rechargeable battery of electronic device 200 can be recharged easily. The process of recharging the rechargeable battery inside the electronic device 200 includes the following steps: putting the power supply 10 next to the casing 202 approximately where the receiver 20 is located; aligning the source coil 12 with the receiving coil 22 and holding the power supply 10 on the casing 202 by magnetizing the electromagnets 23 of the receiver 20; and powering on the source coil 12 of the power supply 10 to induce current in the receiving coil 22.

Figure 2:
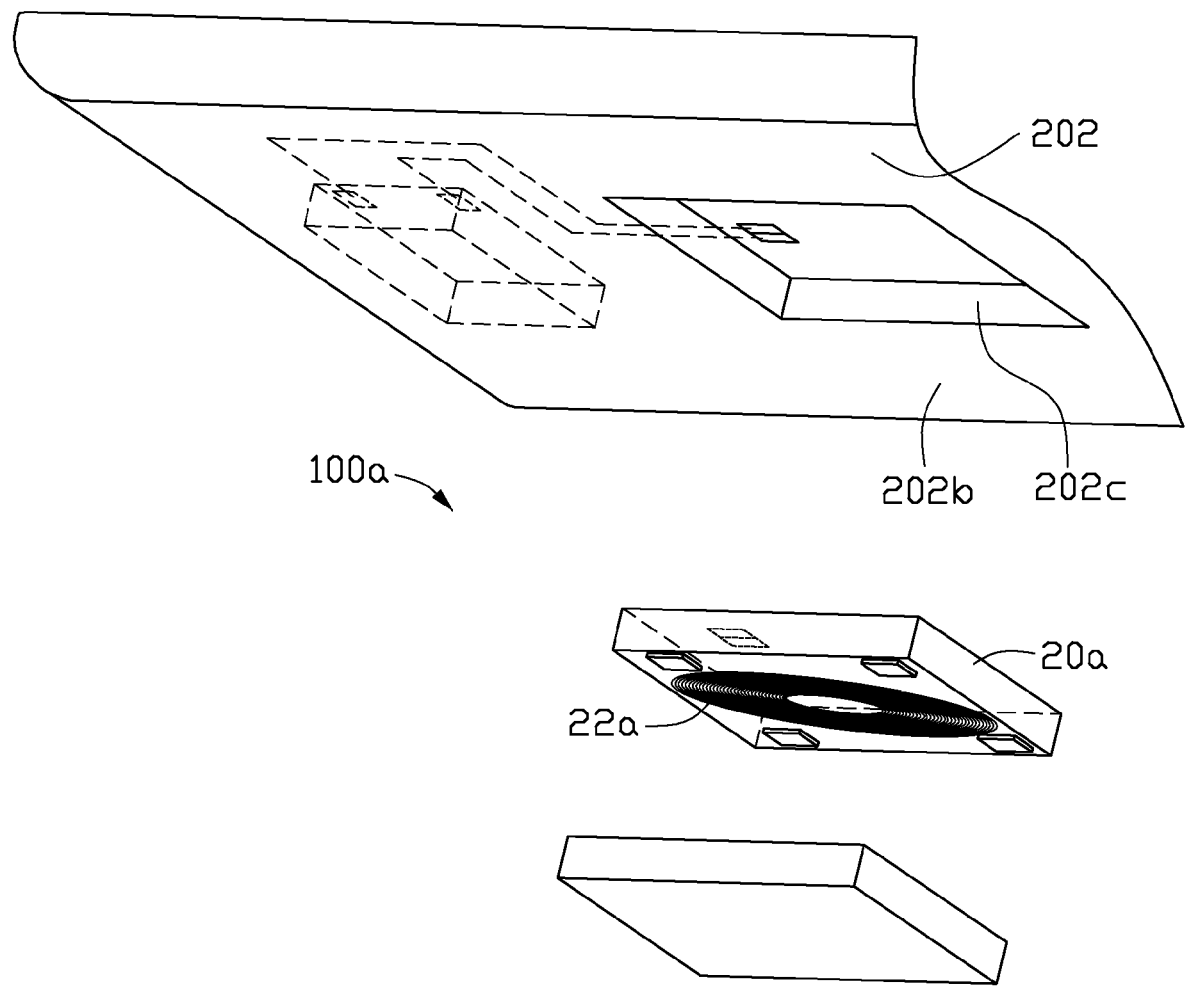
FIG. 2 is a schematic isometric view of a recharging system according to a second exemplary embodiment.

Referring to FIG. 2, a recharging system 100*a* according to a second exemplary embodiment is shown. The recharging system 100*a* is similar to the recharging system 100 of the first exemplary embodiment. The difference between the recharging system 100*a* and the recharging system 100 is that, the receiver 20*a* is located in a housing in the backside of the casing 202 of the electronic device 200 and the receiver 20*a* does not have a core inside the receiving coil 22*a*. An outer surface 202*b* of the casing 202 defines a receiving space 202*c* for receiving the receiver 20*a*. Therefore, the receiver 20*a* can be replaced easily when damaged, and the exact position of the receiver 20*a* can be known easily.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. An electronic device capable of using a rechargeable battery, comprising:

a casing;

a battery housing received in the casing for receiving the rechargeable battery, the battery housing comprising two electrical contacts for electrically connecting two electrodes of the rechargeable battery; and a receiver fixed to a surface of the casing of the electronic device, the receiver comprising a receiving coil, the two ends of the receiving coil being connected to the two electrical contacts of the battery housing respectively, the receiving coil being a planar spiral coil substantially parallel to the surface of the casing of the electronic device, the receiving coil configured for inductively coupling to a magnetic field produced by a power supply, and the receiver further comprising a plurality of electromagnets surrounding the receiving coil, the plurality of electromagnets being connected to the rechargeable battery, wherein a switch is disposed between the plurality of electromagnets and the rechargeable battery and is turned on when the battery is recharged.

* * * * *